(12) United States Patent
Cooper et al.

(10) Patent No.: US 10,872,382 B2
(45) Date of Patent: Dec. 22, 2020

(54) SYSTEMS AND METHODS FOR RECONCILIATION OF VARIOUS LOTTERY TRANSACTIONS

(71) Applicant: Walmart Apollo, LLC, Bentonville, AR (US)

(72) Inventors: Clayton B. Cooper, Rogers, AR (US); Lorrine A. Meyers, Rogers, AR (US); Nathaniel Colt, Centerton, AR (US); Dennis Lee Manley, Bella Vista, AR (US); Larry Dean Curran, Jr., Gentry, AR (US); Dayton Craig Jones, Lowell, AR (US); Melissa A. Jones, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 255 days.

(21) Appl. No.: 15/452,231

(22) Filed: Mar. 7, 2017

(65) Prior Publication Data

US 2017/0256133 A1 Sep. 7, 2017

Related U.S. Application Data

(60) Provisional application No. 62/304,795, filed on Mar. 7, 2016.

(51) Int. Cl.
*G06Q 40/00* (2012.01)
*G07F 17/32* (2006.01)

(52) U.S. Cl.
CPC ........... *G06Q 40/12* (2013.12); *G07F 17/329* (2013.01); *G07F 17/3227* (2013.01)

(58) Field of Classification Search
CPC ............ G07F 17/3244; G07F 17/3227; G07F 17/329; G06Q 40/12; G06Q 50/34
See application file for complete search history.

(56) References Cited

U.S. PATENT DOCUMENTS

| | | | |
|---|---|---|---|
| 6,899,621 B2 | 5/2005 | Behm et al. | |
| 8,311,901 B1 * | 11/2012 | Carmichael | G06Q 10/087 705/28 |
| 8,463,668 B2 | 6/2013 | Youssef et al. | |
| 2003/0228910 A1 | 12/2003 | Jawaharlal et al. | |
| 2003/0236749 A1 * | 12/2003 | Shergalis | G06Q 20/1085 705/43 |

(Continued)

OTHER PUBLICATIONS

Ypercube, "Convert fixed length text file into SQL", Stack Overflow, Dec. 21, 2013 (Year: 2013).*

(Continued)

*Primary Examiner* — Florian M Zeender
*Assistant Examiner* — Vanessa Deligi
(74) *Attorney, Agent, or Firm* — McCarter & English, LLP

(57) ABSTRACT

Described are systems, methods, and computer readable medium for a lottery reconciliation system. Exemplary embodiments provide systems, methods, and computer readable medium for reconciling online lottery game transactions. Exemplary embodiments also provide systems, methods, and computer readable medium for reconciling instant lottery game transactions. Exemplary embodiments also provide systems, methods, and computer readable medium for reconciling lottery game transaction at an interactive vending machine.

9 Claims, 9 Drawing Sheets

(56) References Cited

U.S. PATENT DOCUMENTS

| | | | |
|---|---|---|---|
| 2007/0016505 A1* | 1/2007 | Shebson | G06Q 20/20 |
| | | | 705/35 |
| 2009/0149239 A1* | 6/2009 | Youssef | G07F 17/32 |
| | | | 463/17 |
| 2010/0222125 A1 | 9/2010 | Nyman et al. | |
| 2012/0303645 A1* | 11/2012 | Kulkarni-Puranik | ......................... |
| | | | G06F 40/131 |
| | | | 707/756 |
| 2013/0268379 A1 | 10/2013 | Anderson et al. | |
| 2014/0295946 A1* | 10/2014 | Cameron | G06Q 20/4016 |
| | | | 463/25 |
| 2016/0189467 A1* | 6/2016 | Onorato | G07F 17/329 |
| | | | 463/17 |
| 2017/0018048 A1* | 1/2017 | Christensen | G07F 17/32 |
| 2017/0018148 A1* | 1/2017 | Behm | G07F 17/329 |

OTHER PUBLICATIONS

Baghel, "Import CSV or txt File Into SQL Server Using Bulk Insert", Code Project, May 21, 2014 (Year: 2014).*

Automate Streamlines Lottery Operations and Reporting in Louisiana [online]http://www.networkautomation.com/news/case-studies/13/[retrieved on Jun. 10, 2017] from http://www.networkautomation.com.

Loterity is ready to deliver complete lottery solutions[online] www.world-lotteries.org [ retrieved on [Jan. 19, 2016] Retrieved from Internet http://www.world-lotteries.org/cms/index.

\* cited by examiner

SYSTEMS AND METHODS FOR RECONCILIATION OF VARIOUS LOTTERY TRANSACTIONS

RELATED APPLICATION

This application claims priority to U.S. Provisional Patent Application No. 62/304,795 filed on Mar. 7, 2016, which is hereby incorporated by reference in its entirety.

BACKGROUND

Lottery sales are currently reconciled with the states and third party administrators at a daily or weekly summary level. This is typically carried out at the store level in a corporate entity.

SUMMARY

In an example embodiment, a system includes an application server, a reconciliation server in communication with the application server and a point-of-sale (POS) server in communication with the reconciliation server. The application server includes a data transformation module that is configured to receive lottery transaction data from a third-party server on a daily basis. The lottery transaction data is received as a text file and includes data on individual lottery transactions. The transformation module is further configured to process and convert the lottery transaction data to table data, and transmit the table data to the reconciliation server. The POS server includes an extraction module that is configured to extract lottery sales data from multiple POS systems, store the extracted lottery sales data in a corporate database, and transmit the extracted lottery sales data to the reconciliation server. The reconciliation server is remotely located from the multiple POS systems and includes a reconciliation module that is configured to automatically analyze the table data and the lottery sales data, determine whether discrepancies exist between the table data and the sales data, and generate a record of any determined discrepancies In another embodiment, a system includes an application server and a point of sale (POS) device at a retail store in communication with a third-party server. The POS device is configured to transmit data related to a pack of instant lottery tickets activated in the retail store to the third-party server. The application server is remotely located from the POS device and includes a settlement module that is configured to receive activation data generated by the third party server. The activation data indicates information related to the activated pack of instant lottery tickets. The settlement module is further configured to process and store the activation data in an accounting database. and process a settlement of the activated pack of instant lottery tickets with the third-party server.

In yet another embodiment, a system includes a reconciliation server and an interactive lottery ticket vending machine that is in communication with a third-party server. The interactive lottery ticket vending machine includes a transaction module that is configured to generate lottery transaction data based on transactions occurring at the interactive lottery ticket vending machine, and transmit the lottery transaction data to the third-party server. The reconciliation server is remotely located from the interactive lottery ticket vending machine and includes a reconciliation module that is configured to receive a transaction shift report for a specified time period from the third party server that is generated based on the lottery transaction data. The reconciliation module is further configured to receive sales data from a POS database that indicates sales information for transactions occurred at the interactive lottery ticket vending machine for the specified time period, and automatically analyze the sales data and the transaction shift report to determine whether discrepancies exist between the sales data and the transaction shift report. The reconciliation module is configured to generate a record of any determined discrepancies.

In another embodiment, a method includes receiving lottery transaction data from a third-party server at an application server on a daily basis, where the lottery transaction data is received as a text file and includes data on individual lottery transactions. The method also includes processing and converting the lottery transaction data to table data at the application server, transmitting the table data to a reconciliation server, extracting lottery sales data from multiple POS systems, and storing the extracted lottery sales data in a corporate database. The method further includes transmitting the extracted lottery sales data to the reconciliation server, automatically analyzing the table data and the lottery sales data at the reconciliation server, and determining whether discrepancies exist between the table data and the sales data. The method also includes generating a record of any determined discrepancies.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
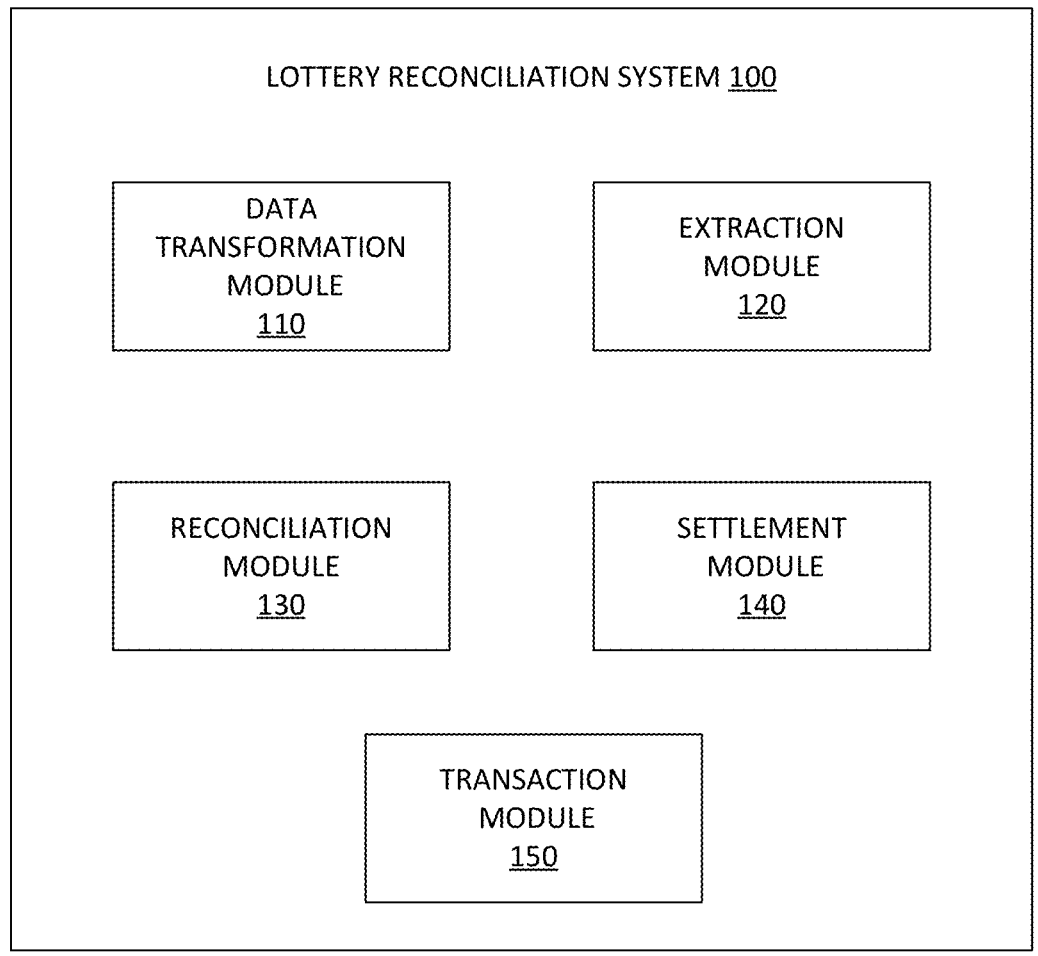
FIG. 1 is a block diagram showing a lottery reconciliation system implemented in modules, according to an example embodiment.

Described herein in detail are systems, methods, and computer readable medium for a lottery reconciliation system. Exemplary embodiments provide systems, methods, and computer readable medium for reconciling online lottery game transactions. Additional exemplary embodiments also provide systems, methods, and computer readable medium for reconciling instant lottery game transactions. Other exemplary embodiments also provide systems, methods, and computer readable medium for reconciling lottery game transaction at an interactive vending machine.

Conventional reconciliation of lottery sales at a daily or weekly summary level does not allow for needed visibility and operational control for lottery sales. Summary reconciliation also allows for significant manual manipulation of the sales data by store and/or corporate associates. Accordingly, exemplary embodiments provide a lottery reconciliation system to employ a process that is conducted via automation at the corporate level rather than a store level, and uses individual transaction data rather than a summary of the transaction data. By reconciling individual transactions, rather than summary data, the lottery reconciliation system can insure that only those transactions that are agreed upon by both the State or third-party administrator (TPA) and the retailer are presented for settlement. All other transactions can be reviewed and either manually rectified or presented to the State/TPA as inaccuracies to be acknowledged or challenged as necessary. Reconciliation of individual lottery transactions rather than reconciliation performed of lottery transactions at a summary level, also provides immediate feedback for operational issues which conventional summary data cannot provide. Individual transaction-level reconciliation can identify issues related to specific operators, daily traffic-related opportunities which may be impacting lottery transactions and specific product related issues. Because the reconciliation process is automated at the corporate level, human interaction with the data is minimized reducing instances of operator errors and store employee malfeasance. Embodiments provide business rules for automated reconciliation that provide an unbiased picture of gain or loss. Further, transaction-level data is easier to access in the event historical review of transaction data is necessary. Transaction level data provided by embodiments may provide data on the most basic components of sales which a daily or weekly summary cannot provide. Further, standardized formats which are required for automation make search criteria easier to define for any future research effort.

Embodiments provide for accurate and reliable financial oversight of four basic types of lottery transactions that require reconciliation. These lottery transactions include (1) sales of "online" lottery games, which may be a "big money" multi-state online game which utilize a single central clearing house; (2) online lottery game winning ticket redemptions and validations (the dispersal of winnings to the customers); (3) instant lottery game sales, such as sales of "scratch" tickets that can be purchased at a POS register or service desk; and (4) Interactive Ticket Vending Machines, which are self-service, lottery ticket vending machines selling scratch, online or other lottery game tickets.

Embodiments reconcile the above four types of lottery transactions via, at least, two data streams. One data stream is originated from the Point-of-sale (POS) or cash register data. The other data stream is originated from the third party's sale records. The current state of the technology for lottery gaming providing summary level reconciliation does not allow for effective reconciliation of item or transaction level sales data because of lack of visibility over the transaction by either the third parties or the POS system. To remedy that situation the lottery reconciliation system of the present invention uses various concepts as described herein to develop and provide for visibility on all of the four above mentioned transaction types using both the POS and third party data streams.

FIG. 1 is a block diagram showing a lottery reconciliation system 100 in terms of modules according to an example embodiment. The modules may be implemented in one or more of POS system 810 and servers 815, 820, 830 shown in FIG. 8. The modules may include a data transformation module 110, an extraction module 120, a reconciliation module 130, a settlement module 140, and transaction module 150. The modules may include various circuits, circuitry and one or more software components, programs, applications, or other units of code base or instructions configured to be executed by one or more processors included in POS system 810 or servers 815, 820, 830. Although modules 110, 120, 130, 140 and 150 are shown as distinct modules in FIG. 1, it should be understood that modules 110, 120, 130, 140 and 150 may be implemented as fewer or more modules than illustrated. It should be understood that any of modules 110, 120, 130, 140 and 150 may communicate with one or more components included in system 800 (FIG. 8), such as POS system 810, third-party server 815, application server 820, reconciliation 830 or database(s) 840.

The data transformation module 110 may be configured to manage and transform transaction data received from a third-party in a text file into a tabular data format. The extraction module 120 may be configured to extract and manage lottery sales data from multiple POS systems and store the extracted data in a corporate database. The reconciliation module 130 may be configured to analyze and reconcile data received from POS systems and received from third parties. The settlement module 140 may be configured to manage and analyze activation data from a third-party and process a settlement based on the activation data. The transaction module 150 may be configured to generate and manage lottery transaction data for transactions occurring at an interactive lottery ticket vending machine.

Online lottery game sales are recorded by both parties. Embodiments may accomplish reconciliation of individual lottery game transactions using a daily transactional feed received from the third parties by a staging and pre-processing server. The third party data may then be converted from a "flat file" text format in which it is received into a tabular data format. The table data is then processed by a matching engine where it is matched to individual lottery transaction data previously extracted from POS systems and stored in corporate level databases. Redemptions and validations of winning tickets can be tracked by both POS and Third Parties and may therefore be handled in much the same manner as online lottery game sales.

Figure 2:
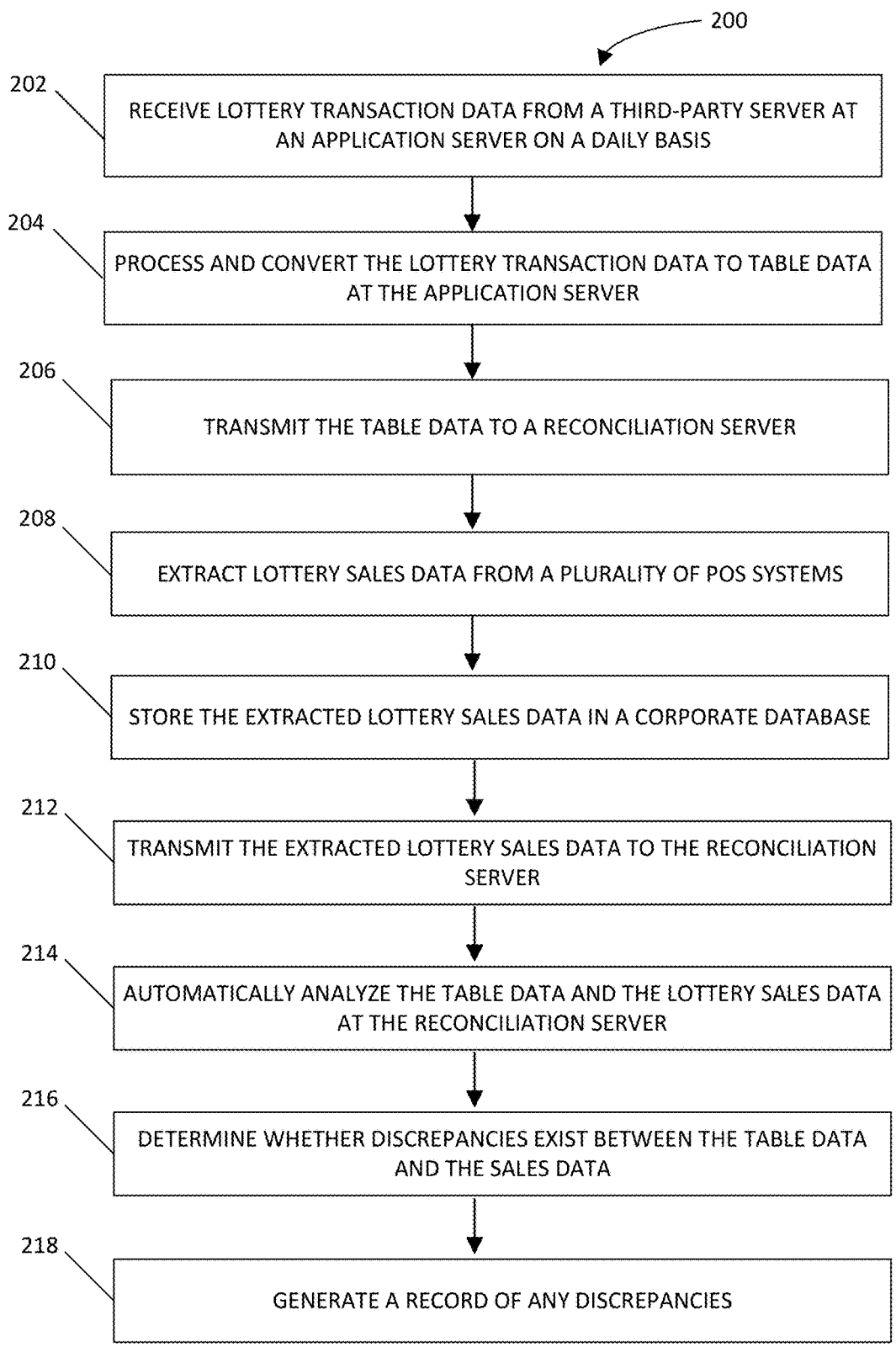
FIG. 2 is a flowchart showing an exemplary method for reconciliation of online lottery game transactions, according to an example embodiment.

FIG. 2 is a flowchart showing an exemplary method 200 for reconciliation of online lottery game transactions and redemptions, according to an example embodiment.

At step 202, the data transformation module 110 receives lottery transaction data from a third-party server (e.g., third-party server 815) at an application server (e.g., application server 820) on a daily basis. The lottery transaction data is received as a text file and includes data on individual lottery transactions. The lottery transaction data relates to individual purchased or redeemed online lottery games, not a summary of transactions that may have occurred within a period of time. At step 204, the transformation module 110 processes and converts the lottery transaction data from the text file to table data at the application server. At step 206, the table data is transmitted to a reconciliation server.

At step 208, the extraction module 120 extracts lottery transaction data for individual lottery transactions from multiple POS systems. In some embodiments, the lottery sales data is generated when an online lottery ticket is scanned at the POS system. At step 210, the extraction module 120 stores the extracted lottery sales data in a corporate database. At step 212, the extracted lottery sales data is transmitted to the reconciliation server. At step 214, the reconciliation module 130 automatically analyzes the table data and the lottery sales data at the reconciliation server. At step 216, the reconciliation module 130 determines whether discrepancies exist between the table data and the sales data. At step 218, a record is generated of any determined discrepancies.

Figure 3:
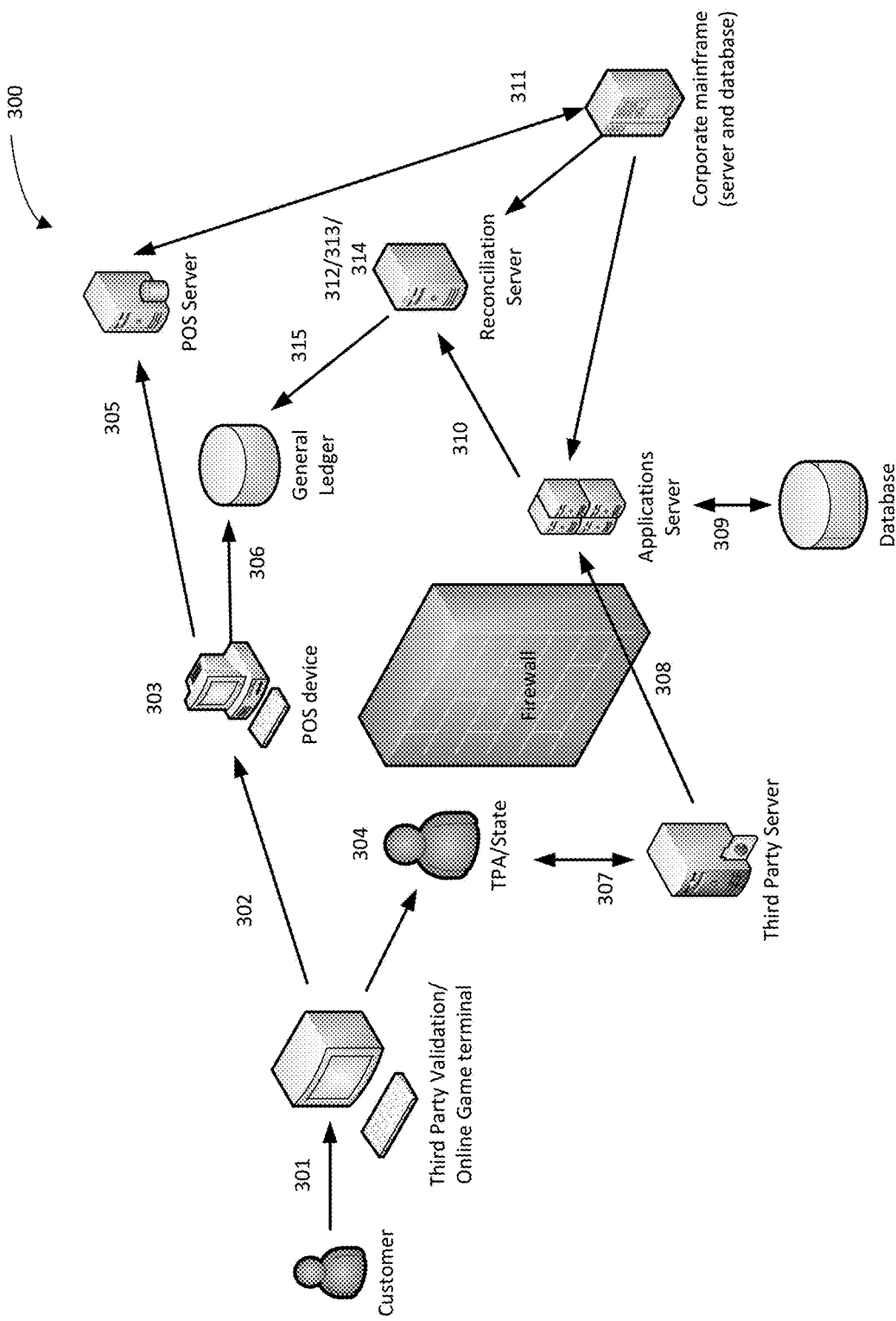
FIG. 3 depicts an exemplary system for reconciliation of online lottery game transactions, according to an example embodiment.

FIG. 3 depicts an exemplary system 300 for reconciliation of online lottery game transactions and redemptions, according to an example embodiment. The data flow within system 300 is described here. A customer purchases an online lottery game ticket or validates a winning ticket using a terminal connected to a third party or state online gaming system (301). The terminal prints out a lottery ticket or redemption voucher (302). An associate scans the printed ticket or voucher at a POS system (303). A data record for the transaction is transmitted to the third party/state server (304). The transaction data generated from scanning the ticket or voucher at the POS system is transmitted to a POS database for storing (305). The transaction data is also transmitted to a general ledger database as a credit or debit record (306).

The third party/state server transmits the data record for the transaction on a daily basis to an intermediary server (307). The intermediary server automatically forwards the data record across a corporate firewall to an application server within a corporate infrastructure (308). The data record received from the third party server is processed, parsed, and converted to data tabular format (309). Transaction data is extracted daily and transmitted to reconciliation server (310). POS scan data is extracted from the POS database and sent to the reconciliation server on a daily basis (311). The reconciliation server performs matching of third party/state extracted data and the POS data (312), and flags any discrepancies (313). After examination manual matching is performed where necessary (314) and all other legitimate discrepancies are adjusted in the general ledger (315).

In an example embodiment, the POS system, application server and the reconciliation server are in communication with one another via an internal corporate network. The third-party server and the intermediary server are not in direct communication with the internal corporate network, and transmit data to the application server across a firewall.

Instant lottery games are another type of lottery transaction. Unlike online lottery sales and redemptions, instant lottery games such as scratch tickets are conventionally not well tracked by the third parties or the state lottery administrations at an item or transaction level. Instead, instant lottery games have been conventionally tracked and sold in bulk transactions which does not provide adequate granularity for good corporate financial reconciliations.

In an example embodiment, the lottery reconciliation system of the present invention uses an activation data feed from the third party/state combined with a 21-day industry standard settlement process to reduce the workload of manual reconciliation and settlement. "Settlement" as used herein refers to settling accounts of credit or debit between a retailer of lottery games and the third-party administrator. In this embodiment, the retailer receives a daily feed from the third-parties which contains pertinent information concerning the bulk transactions for block or books of instant lottery game tickets. This data may be stored in database tables, and general ledger entries may be automatically created for activation of packs of tickets. The reconciliation then facilitates auto-settlement on the packs 21 days after activation. The data stored in the general ledger database is used to automatically create a record of the settlement of liability. This reduces the amount of manual interaction required for settlement and for recording general ledger entries. As a confirmation tool, a monthly report is published to allow corporate or store managers to validate the automatically created general ledger entries.

Figure 4:
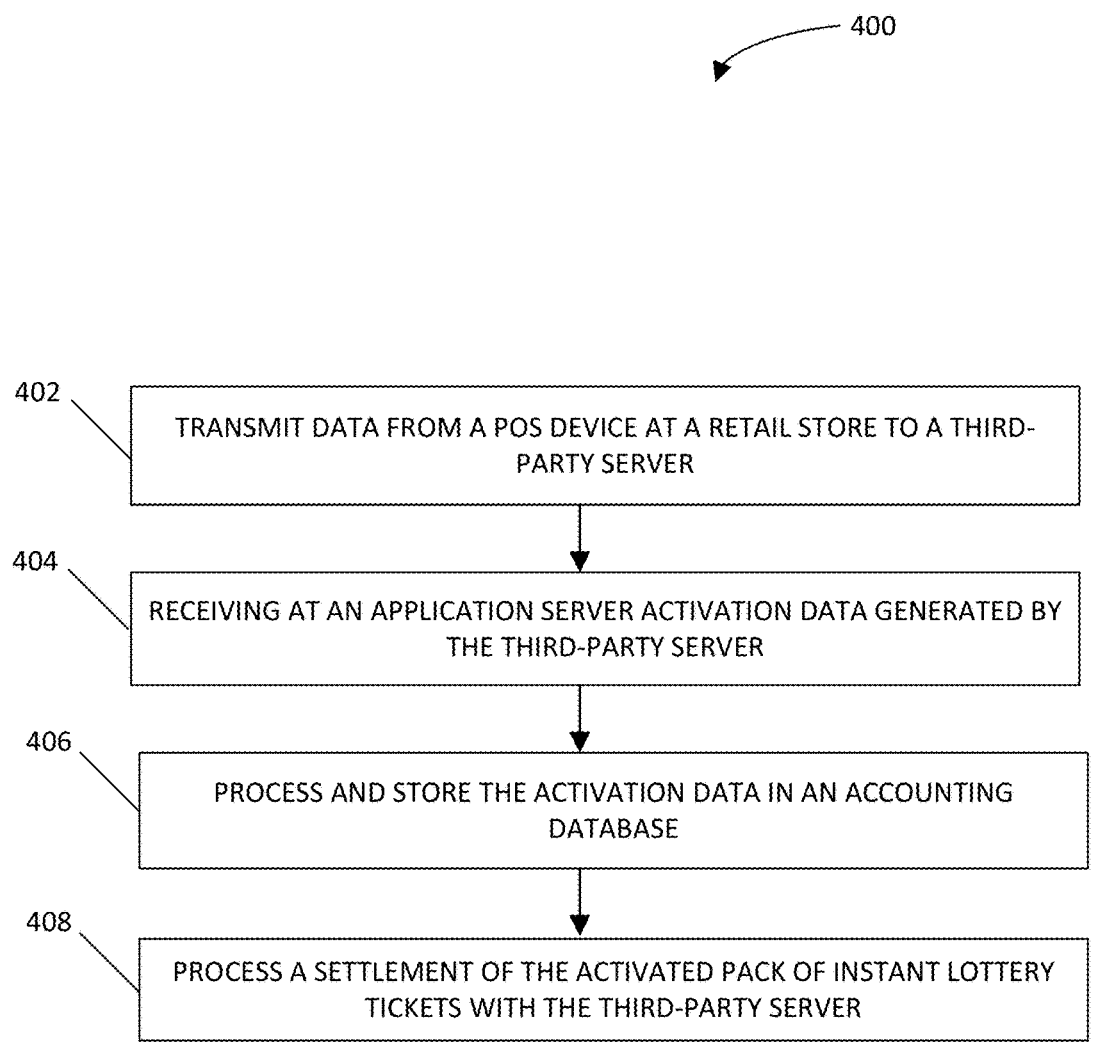
FIG. 4 is a flowchart showing an exemplary method for reconciliation of instant lottery scratch ticket game transactions, according to an example embodiment.

FIG. 4 is a flowchart showing an exemplary method 400 for reconciliation of instant lottery game transactions, according to an example embodiment. At step 402, data from the POS system at a retail store is transmitted to a third-party server. The data is related to a pack or bundle of instant lottery tickets, such as scratch-off tickets, activated in the retail store. For example, the data may be identifying data for the pack, such as, a game number, a game name, a pack number, an activation status, the date of activation, a cost per unit, and a number units per pack or bundle. In some embodiments, the data related to the pack of instant lottery tickets is transmitted to the third-party server when a barcode on the pack is scanned.

At step 404, the settlement module 140 on an application server receives activation data generated by the third party server. The activation data includes information related to the activated pack of instant lottery tickets. In some embodiments, the activation data is received by the application server from the third-party server across a firewall associated with an internal corporate network to which the application server has access and to which the third-party server does not have access.

At step 406, the settlement module 140 processes and stores the activation data in an accounting database. At step 408, the settlement module 140 automatically processes a settlement of the activated pack of instant lottery tickets with the third-party server. In some embodiments, the settlement is processed by the application server 21 days after the activation data is processed by the settlement module 140.

In some embodiments, the POS system is also configured to transmit data for an individual instant lottery ticket when the individual instant lottery ticket is scanned at the POS device. A reconciliation server including the reconciliation module 130 automatically analyzes sales data for individual instant lottery tickets from the POS system and transaction data for individual instant lottery tickets received from the third-party server.

Figure 5:
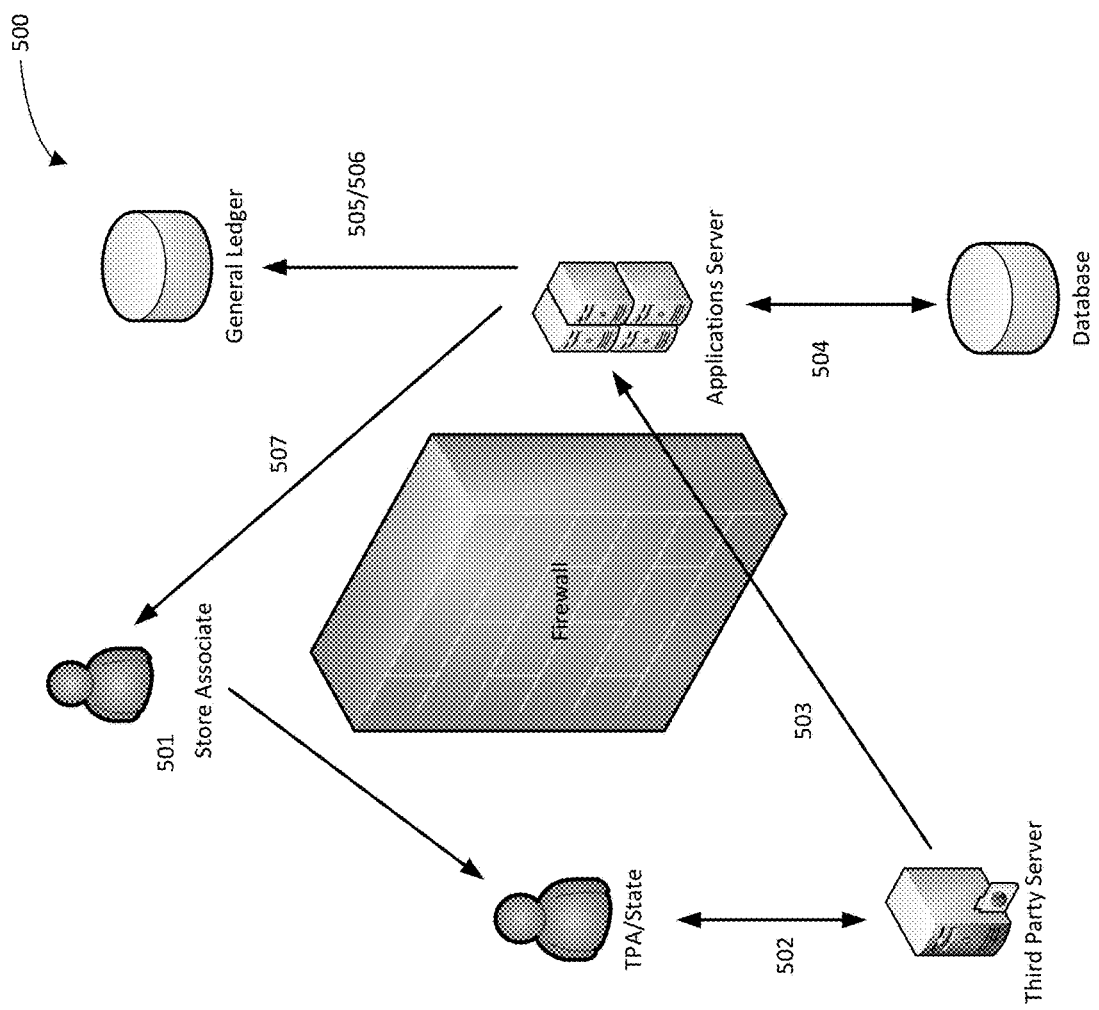
FIG. 5 depicts an exemplary system for reconciliation of instant lottery scratch ticket game transactions, according to an example embodiment.

FIG. 5 depicts an exemplary system 500 for reconciliation of instant lottery game transactions, according to an example embodiment. After a store associate scans a lottery instant ticket pack for activation, the data for the activated pack is transmitted to the third-party/state, and the transaction is recorded by the third party/state server (501). The third party/state generates and sends an activation feed detailing the data for the newly activated packs to the intermediary servers (502). The activation feed is automatically forwarded by the intermediary servers across the firewall to the application server connected to an internal corporate network (503). The application server parses the activation data, converts the data to a tabular format, and stores the converted data in the database. (504). The activation feed may be automatically converted to general ledger entries (505). At 21 days after activation, settlement entries may be automatically created and saved to a general ledger database (506). The data stored in the general ledger database includes profit/cost center information, dollar amount, general ledger account numbers, and company codes. A lottery ticket transaction may generate 6 to 8 general ledger entries depending on the nature of the transaction. The reconciliation process automatically makes entries to a two column system which requires a debit and a credit for each transaction. In addition to actual sales amount, data for rebates, discounts and commissions are also automatically accounted for each line of transaction in the general ledger database. A monthly summary report may also be generated for store and/or corporate associates to review.

In another embodiment, transactions for the instant lottery game tickets may be reconciled using a cooperative operation with the third parties and the POS systems. In this embodiment, an operation called "scan-and-send" provides transaction information via an XML message using simple object access protocol (SOAP) to a server under the authority of the third party each time an individual instant lottery ticket is scanned at the POS system. This provides third parties an item level view of the instant ticket sales which can then be used to provide a highly granular sales report which can be matched against the POS system data for accuracy.

Transactions at interactive vending machines provide the third parties with some granular detail concerning sale transactions. However, currently there is no interface between the vending machines and POS systems. This means that the POS system does not have sufficient visibility on the transactions to provide necessary POS sales data for reconciliation. In an example embodiment, the resolution of this problem involves generating a "shift report" and printing it. This report includes item level data of transactions that have taken place during the previous "shift." This data is also encoded in 2D matrix code blocks. At the end of a shift, a designated associate uses the report to make a bulk cash entry into the POS system. This amount can be compared against an amount provided by the third parties on a daily basis. At the same time as the reconciliation of total cash amounts is conducted, an auto entry into the general ledger is produced using other data provided by the third parties for refund vouchers and "reinvestment credits" (winnings reimbursed by the machines in the form of more games).

Figure 6:
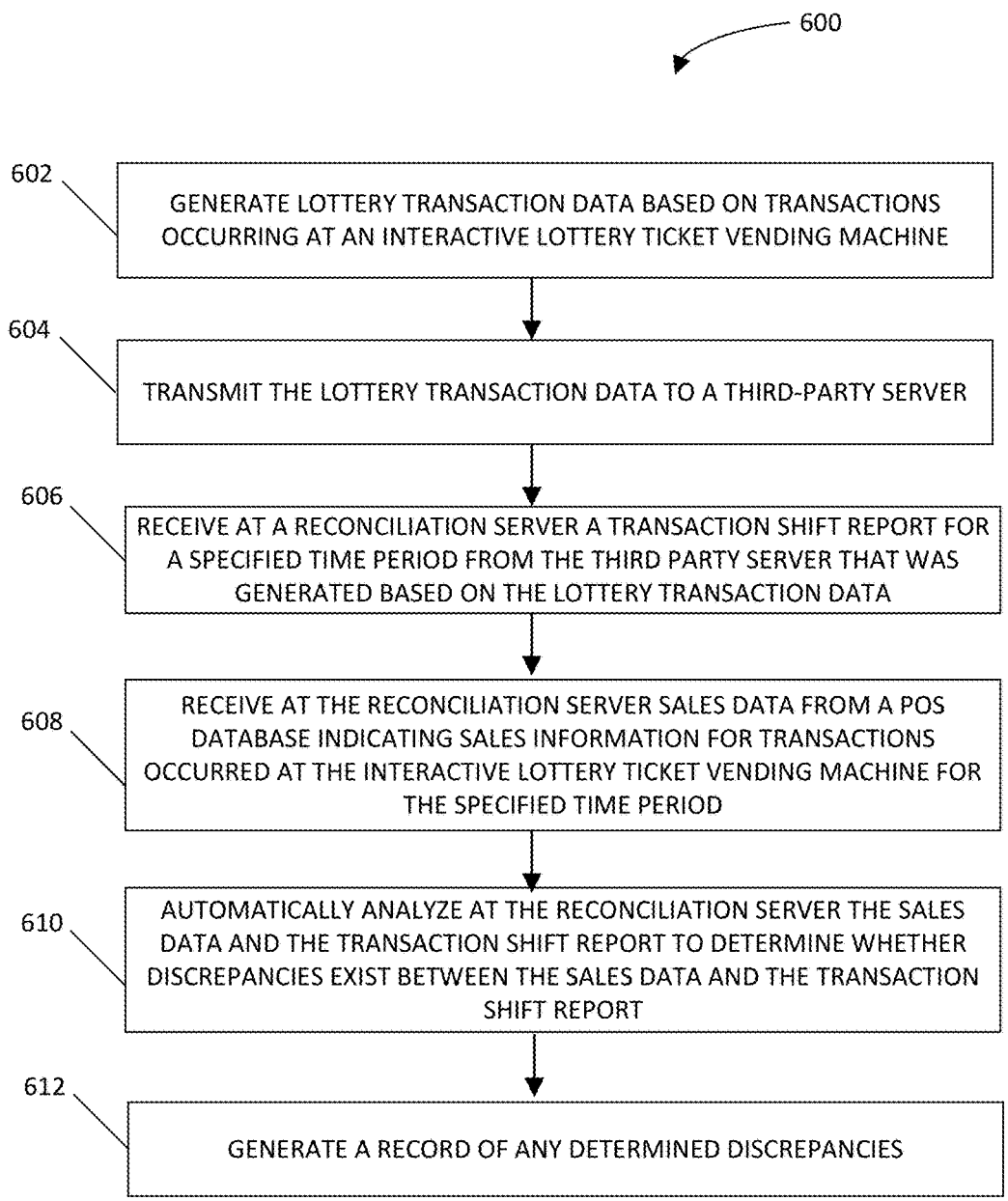
FIG. 6 is a flowchart showing an exemplary method for reconciliation of transactions at an interactive vending machine, according to an example embodiment.

FIG. 6 is a flowchart showing an exemplary method 600 for reconciliation of transactions at an interactive vending machine, according to an example embodiment. The interactive lottery ticket vending machine can perform various transactions, including a sale transaction of an instant lottery ticket, a sale transaction of an online lottery ticket, a refund transaction for vouchers, a reinvestment transaction, and a redemption transaction.

At step 602, the transaction module 150 generates lottery transaction data based on transactions occurring at the interactive lottery ticket vending machine. At step 604, the transaction module 150 transmits the lottery transaction data to the third-party server. A reconciliation server is remotely located from the interactive lottery ticket vending machine and includes the reconciliation module 130. At step 606, the reconciliation module 130 receives a transaction shift report for a specified time period from the third party server that was generated based on the lottery transaction data. In some embodiments, the transaction shift report is received by the reconciliation server from the third party server through a firewall associated with an internal corporate network with which the reconciliation server is in communication but with which the third party server is not.

At step 608, the reconciliation module 130 receives sales data from a POS database indicating sales information for transactions occurred at the interactive lottery ticket vending machine for the specified time period. In some embodiments, the interactive lottery ticket vending machine generates the sales data for the specified time period when prompted by a user. In some embodiments, a POS system receives the sales data generated by the interactive lottery ticket vending machine, and transmits the sales data to the POS database. For example, the interactive lottery ticket vending machine may include a communication interface supporting wired or wireless communication with a POS system. In one embodiment, data for each individual lottery transaction taking place at the interactive lottery ticket vending machine may be transmitted via the communication interface to the POS system.

At step 610, the reconciliation module 130 automatically analyzes the sales data and the transaction shift report to determine whether discrepancies exist between the sales data and the transaction shift report. At step 612, the reconciliation module 130 generates a record of any determined discrepancies. In some embodiments, the interactive lottery ticket vending machine is in communication with a POS server, and can transmits transaction data to the POS server.

Figure 7:
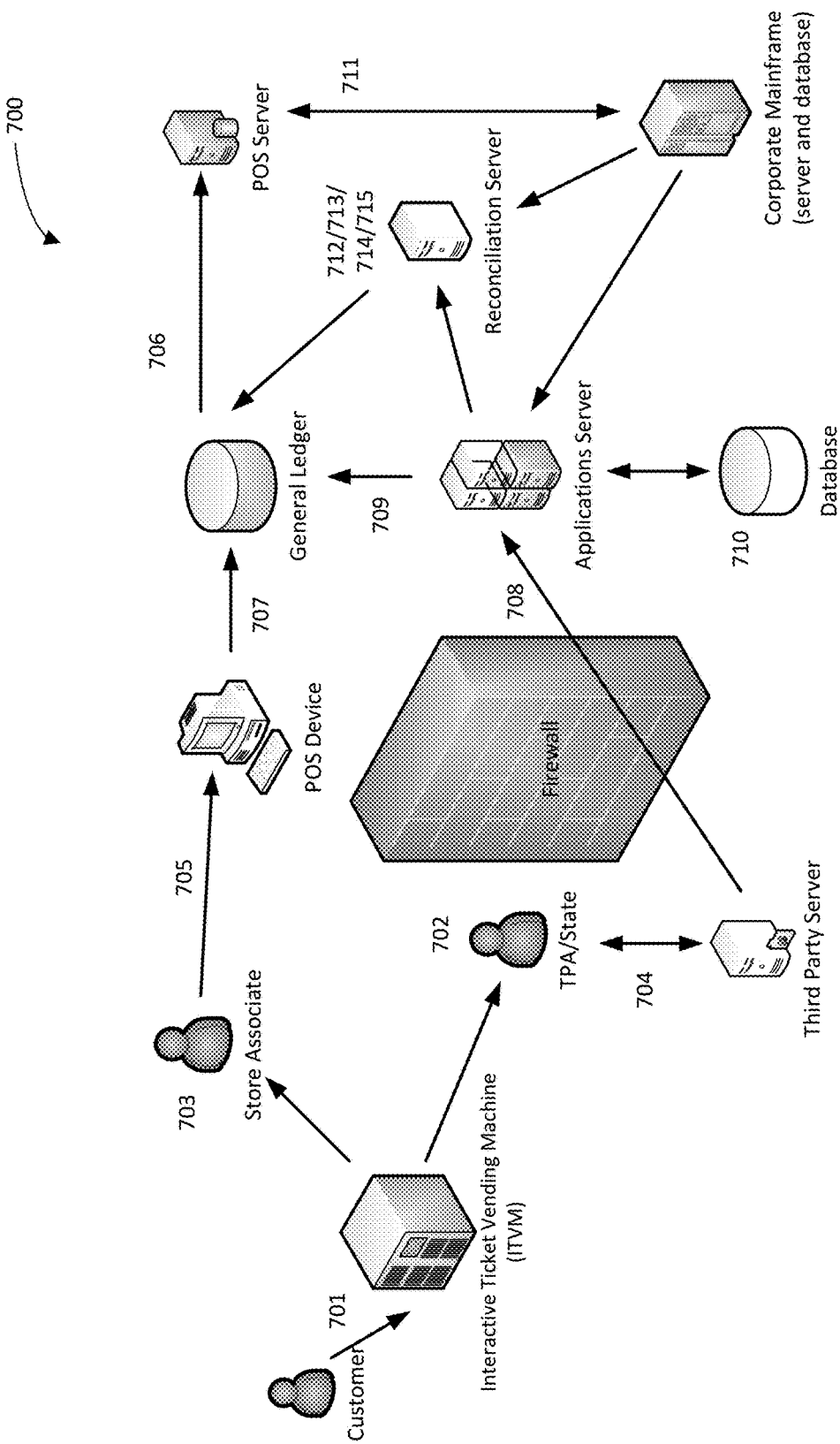
FIG. 7 depicts an exemplary system for reconciliation of transactions at an interactive vending machine, according to an example embodiment.

FIG. 7 depicts an exemplary system 700 for reconciliation of transactions at an interactive vending machine, according to an example embodiment. A customer purchases an online or instant game at an interactive ticket vending machine (701). The vending machine sends a record of the transaction to third party/state (702). A store associate requests or causes the print out of a shift report (703). The third party/state produces an equivalent shift report and posts it to the intermediary server (704). The associate enters the total cash amount indicated on the shift report into the POS system (705). The data from the POS system is exported to POS database tables (706). A record of credit or debit is transmitted to the general ledger database for the total cash amount (707). The intermediary server automatically forwards the third party shift report across the firewall to an application server in communication with an internal corporate network (708). The third party shift report is parsed and tabled to a database, and general ledger entries are automatically posted for refund vouchers, reinvestment credits, and online and instant lottery ticket sales (709).

The third party shift data (actual cash collected) is extracted daily and sent to the reconciliation server from the database (710). The daily POS scan data is extracted from the database table and sent to the reconciliation server (711). The reconciliation server performs matching of third party/state reported total cash amount and POS entry for cash collected (712). Any discrepancies are flagged (713), and after examination manual matching may be performed where necessary (714). All other legitimate discrepancies may be adjusted in the general ledger (715).

As discussed briefly above, in another embodiment, a resolution for reconciling interactive lottery ticket vending machine transactions involves vending machines with the capability of communicating with POS systems. In this embodiment, the corporate system is able to view the interactive lottery ticket vending machine as an independent POS system, and thus have the machines generate transaction data in the same format as the POS systems. An interactive lottery ticket vending machine that is so equipped can follow the process used for reconciling online lottery games and redemptions as described above.

In an example embodiment, a reconciliation process for the interactive lottery ticket vending machine transactions is consolidated under a single web application lottery operations portal. The lottery operations portal may support multi-tier authentication and accesses and functions for external as well as internal users. For external users, functions like game maintenance may be provided where state or third party administrators can manage game changes without necessitating interactions with associates at individual stores. Also, for external users, a file status dashboard may be provided which allows a state or third parties to view a processing status of input files. Additionally, for external users, third party help and ticket creation and management may be provided so that state or third parties can resolve problems in a manner that can be tracked and measured.

Various functions may be provided by the lottery operations portal for internal users as well. In some embodiments for example, configuration management may be provided so that store associates can maintain lottery configurations such as file mapping, commission rates, file input times and other configurable data pertinent to the input process. An adjustment console may also be provided as a means for rectifying complicated accounting irregularities with scenario-driven options. A reports and controls dashboard may also provide visibility on controls, reports, graphics and other measures without the necessity of emailing to a distribution list. A lottery data search engine may provide a user, such as a corporate financial services associate, a corporate level manager or technical support, means to perform limited searches of databases for research purposes.

The use of the lottery operations portal may decrease the effort involved in support, operation, and control of the corporate lottery process by providing the necessary tools in a single location and by offering a way for the individual lottery entities to self-manage some aspects of their products.

Improvements to the interactive lottery ticket vending machine reconciliation process may be achieved through hardware and software upgrades at the Point-of-Sale system level. For example, improvements may include (1) touchscreen display of lottery games, (2) a scan and send interface with third party administrators, and (3) a direct or indirect interface with the interactive vending machine. The use of touchscreen displays may reduce the amount of human error incurred in the process of scanning bar codes from a "cheat sheet". Conventionally, a procedure is to use a barcode scanner to enter game data into the POS system by use of a booklet of bar codes that is distributed to all stores that sell lottery games. With such a process, it is easy for the wrong bar code to be scanned. Further, in addition to the risk of human error, the logistics of maintaining and distributing the "cheat sheet" booklets is daunting when applied to corporate entities with a large number of stores. The touch screen display feature at the POS system allows changes and updates to be applied dynamically and rolled out to all impacted stores without the need to create new booklets. This enables timely updates as well as eliminating the costs associated with producing the booklets.

An interactive lottery ticket vending machine equipped with a scan and send interface to third parties enables the reporting of individual lottery transactions to provide both the third party administrators and corporate operations employees visibility on sales at a very low level (individual transaction level). This data provides for better reconciliation as well as improved visibility on potential issues. In an example embodiment, the scan and send interface employs the use of XML for interchange of data over a SOAP connection.

In a direct interface scenario, the interactive lottery ticket vending machine appears to the store's Point of Sale system as a register. This provides up-to-date information on all transactions conducted on the interactive vending machines. Normal POS processing is applied as it would for similar transactions on normal registers. In an indirect interface, the interactive lottery ticket vending machine updates the systems of the state or third party who then sends a transaction or batch feed to corporate systems. The data is then used to update lottery tables in lieu of POS data. At that point normal lottery processes process the data in the same manner as normal Point-of-Sale lottery transactions.

The benefit of exemplary embodiments is that backend processing can be simplified, greater visibility of data content can be provided, and more detailed and meaningful historical data is made available for research, estimation and forecasting. Exemplary embodiments described above, combined with the resources of a large corporation, bring the lottery gaming industry from the conventional standards designed for "mom-and-pop" stores to one that is sustainable and manageable at large enterprise scales.

Figure 8:
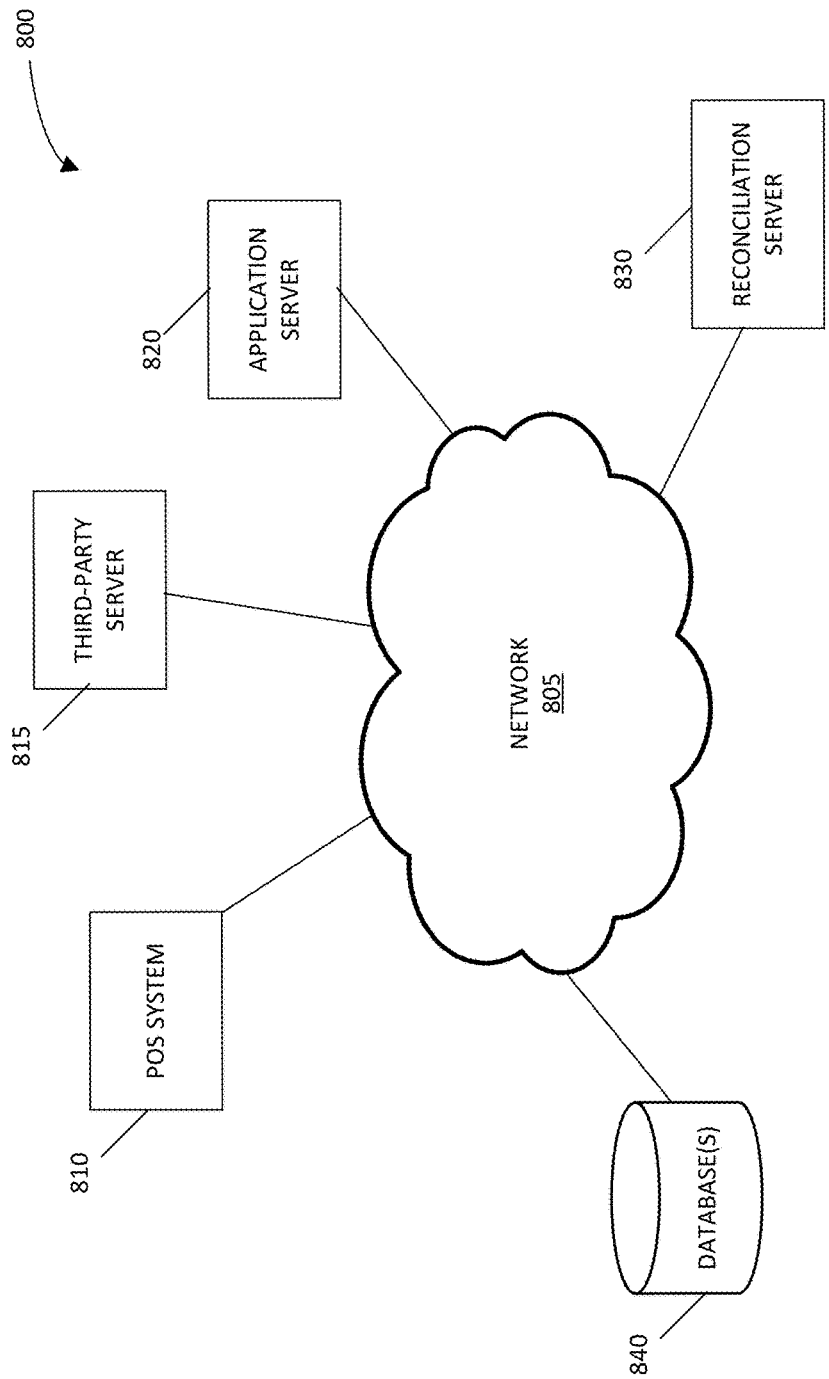
FIG. 8 illustrates a network diagram depicting a system for implementing the lottery reconciliation system, according to an example embodiment.

FIG. 8 illustrates a network diagram depicting a system 800 for implementing the lottery reconciliation system, according to an example embodiment. The system 800 can include a network 805, POS system 810, third-party server 815, application server 820, reconciliation server 830, and database(s) 840. Each of components 810, 815, 820, 830, and 840 is in communication with the network 805.

In an example embodiment, one or more portions of network 805 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The POS system 810 may include, but is not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The POS system 810 is part of a store infrastructure and aids in performing various transactions related to sales and other aspects of a store. Being part of a store's infrastructure, the POS system 810 may be installed within the store or may be installed or operational outside of the store. For example, the POS system 810 may be a mobile device that a store employee can use outside of the store to perform transactions or other activities. In another example, the POS system 810 may be a kiosk installed outside the store. Similarly, the POS system 810 may be a mobile device that can be used within the store, and is not physically installed or attached to one particular location within the store. The POS system 810 can include one or more components described in relation to computing device 900 shown in FIG. 9.

The POS system 810 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

The POS system 810 may connect to network 805 via a wired or wireless connection. The POS system 810 may include one or more applications such as, but not limited to, a payment transaction application and the lottery reconciliation system described herein.

In an example embodiment, one or more components of the lottery reconciliation system 100 may be included in the POS system 810, third-party server 815, application server 820, and/or reconciliation server 830. Some of the functionalities of the lottery reconciliation system 100 may be performed by the POS system 810, third-party server 815, application server 820, and/or reconciliation server 830.

Each of the database(s) 840 and servers 815, 820, 830 is connected to the network 805 via a wired connection. Alternatively, one or more of the database(s) 840 and servers 815, 820, 830 may be connected to the network 805 via a wireless connection. The servers 815, 820, 830 include one or more computers or processors configured to communicate with POS system 810 and database(s) 840 via network 805. The servers 815, 820, 830 host one or more applications or websites accessed by POS system 810 and/or facilitate access to the content of database(s) 840. Database(s) 840 include one or more storage devices for storing data and/or instructions (or code) for use by POS system 810 and servers 815, 820, 830. Database(s) 840, and/or servers 815, 820, 830, may be located at one or more geographically distributed locations from each other or from POS system 810. Alternatively, database(s) 840 may be included within servers 815, 820, 830.

Figure 9:
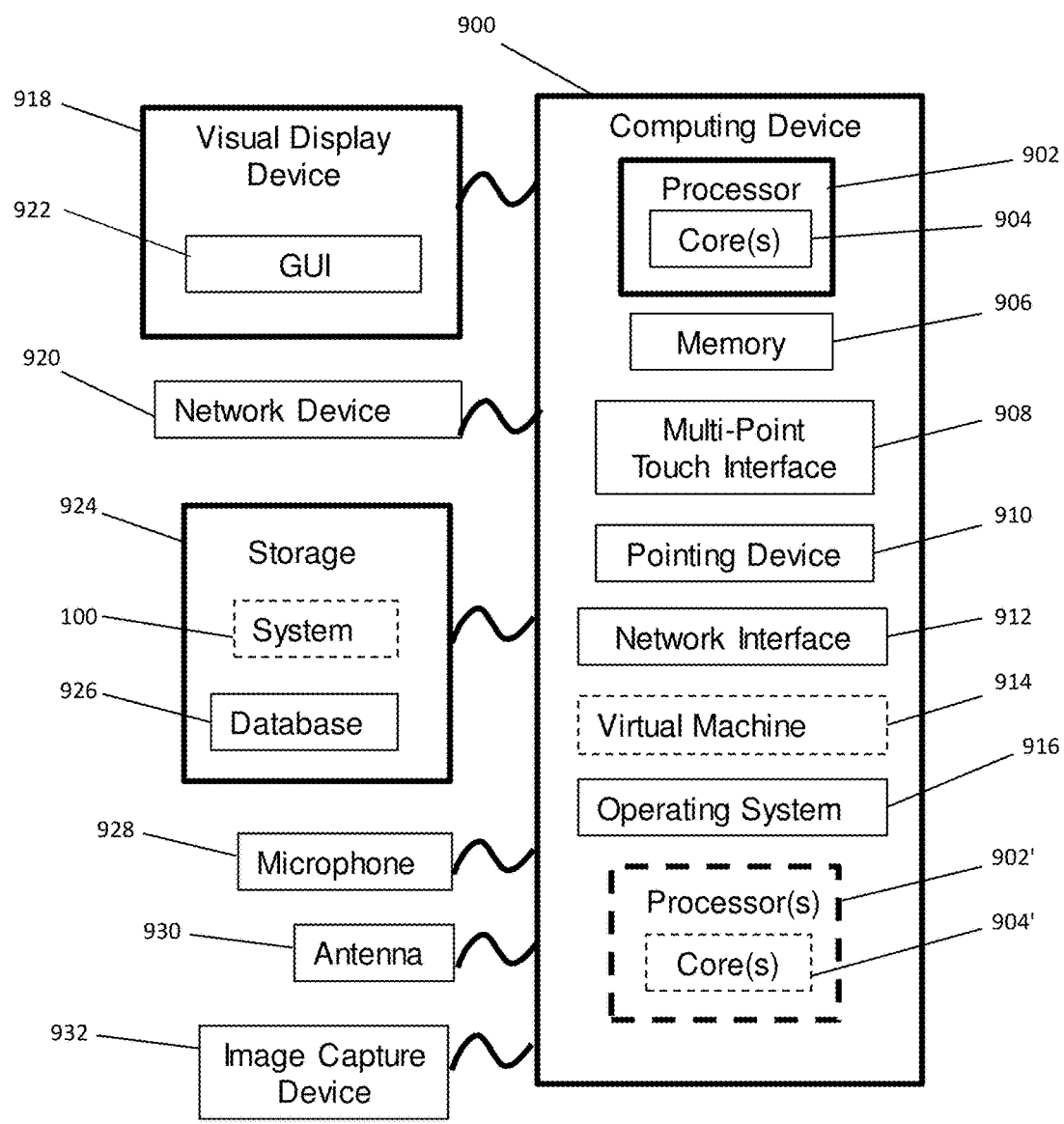
FIG. 9 is a block diagram of an exemplary computing device that can be used to implement exemplary embodiments of the lottery reconciliation described herein.

FIG. 9 is a block diagram of an exemplary computing device 900 that may be used to implement exemplary embodiments of the lottery reconciliation system 100 described herein. The computing device 900 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 906 included in the computing device 900 may store computer-readable and computer-executable instructions or software for implementing exemplary embodiments of the lottery reconciliation system 100. The computing device 900 also includes configurable and/or programmable processor 902 and associated core 904, and optionally, one or more additional configurable and/or programmable processor(s) 902' and associated core(s) 904' (for example, in the case of computer systems having multiple processors/cores), for executing computer-readable and computer-executable instructions or software stored in the memory 906 and other programs for controlling system hardware. Processor 902 and processor(s) 902' may each be a single core processor or multiple core (904 and 904') processor.

Virtualization may be employed in the computing device 900 so that infrastructure and resources in the computing device may be shared dynamically. A virtual machine 914 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 900 through a visual display device 918, such as a computer monitor, which may display one or more graphical user interfaces 922 that may be provided in accordance with exemplary embodiments. The computing device 900 may include other I/O devices for receiving input from a user, for example, a keyboard or any suitable multi-point touch interface 908, a pointing device 910 (e.g., a mouse), a microphone 928, and/or an image capturing device 932 (e.g., a camera or scanner). The multi-point touch interface 908 (e.g., keyboard, pin pad, scanner, touch-screen, etc.) and the pointing device 910 (e.g., mouse, stylus pen, etc.) may be coupled to the visual display device 918. The computing device 900 may include other suitable conventional I/O peripherals.

The computing device 900 may also include one or more storage devices 924, such as a hard-drive, CD-ROM, or other computer readable media, for storing data and computer-readable instructions and/or software that implement exemplary embodiments of the lottery reconciliation system 100 described herein. Exemplary storage device 924 may also store one or more databases for storing any suitable information required to implement exemplary embodiments. For example, exemplary storage device 924 can store one or more databases 926 for storing information, such employee work schedules, payroll information, number of current employees, number of hours worked, number of hours scheduled, employment status, open requisitions, goal hours, low-point information, budget information, and/or any other information to be used by embodiments of the system 100. The databases may be updated manually or automatically at any suitable time to add, delete, and/or update one or more items in the databases.

The computing device 900 can include a network interface 912 configured to interface via one or more network devices 920 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 900 can include one or more antennas 930 to facilitate wireless communication (e.g., via the network interface) between the computing device 900 and a network. The network interface 912 may include a built-in network adapter, network interface card, PCMCIA network card, card bus network adapter, wireless network adapter, USB network adapter, modem or any other device suitable for interfacing the computing device 900 to any type of network capable of communication and performing the operations described herein. Moreover, the computing device 900 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 900 may run any operating system 916, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 916 may be run in native mode or emulated mode. In an exemplary embodiment, the operating system 916 may be run on one or more cloud machine instances.

The following description is presented to enable any person skilled in the art to create and use a computer system configuration and related method and article of manufacture to reconcile various lottery transactions. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system comprising:
   an application server;
   a reconciliation server in communication with the application server; and
   a point-of-sale (POS) server in communication with the reconciliation server, the application server, reconciliation server and POS server controlled by an entity affiliated with a plurality of POS systems;
   wherein the application server includes a-data transformation instructions that when executed cause the application server to:
      receive lottery transaction data from a third-party server on a daily basis, the lottery transaction data received as a text file and including data on individual lottery transactions,
      process and convert the lottery transaction data to table data, and
      transmit the table data to the reconciliation server;
   wherein the point-of-sale (POS) server includes extraction instructions that when executed cause the POS server to:
      extract lottery sales data from the plurality of POS systems located at a plurality of locations,
      store the extracted lottery sales data from the plurality of locations in a database controlled by the entity, and
      transmit the extracted lottery sales data to the reconciliation server; and
   wherein the reconciliation server is remotely located from the plurality of POS systems and includes reconciliation instructions that when executed cause the reconciliation server to:
      automatically perform a daily reconciliation of the table data and the lottery sales data,
      determine, based on the daily reconciliation, whether discrepancies exist between the table data and the sales data, and
      generate a record of any determined discrepancies.

2. The system of claim 1, wherein the lottery transaction data relates to individual purchased online lottery tickets.

3. The system of claim 1, wherein the lottery transaction data relates to individual redeemed online lottery tickets.

4. The system of claim 1, further comprising a POS device configured to:
   generate the lottery sales data when a user scans an online lottery ticket at the POS device.

5. The system of claim 1, wherein the application server, the POS server, and the reconciliation server are in communication with an internal corporate network.

6. The system of claim 5, wherein the third-party server is not connected to the internal corporate network and transmits the lottery transaction data to the application server across a firewall associated with the internal corporate network.

7. A method comprising:
   receiving lottery transaction data from a third-party server at an application server on a daily basis, the lottery transaction data received as a text file and including data on individual lottery transactions;
   processing and converting the lottery transaction data to table data at the application server;
   transmitting the table data to a reconciliation server, the application server and reconciliation server controlled by an entity affiliated with a plurality of POS systems;
   extracting lottery sales data from the plurality of POS systems located at a plurality of locations;
   storing the extracted lottery sales data from the plurality of POS systems at the plurality of locations in a database controlled by the entity;
   transmitting the extracted lottery sales data to the reconciliation server;

automatically perform a daily reconciliation of the table data and the lottery sales data at the reconciliation server;

determining, based on the daily reconciliation, whether discrepancies exist between the table data and the sales data; and generating a record of any determined discrepancies.

8. The method of claim 7, wherein the lottery transaction data relates to individual purchased online lottery tickets.

9. The method of claim 7, wherein the lottery transaction data relates to individual redeemed online lottery tickets.

\* \* \* \* \*